(12) United States Patent
Amit et al.

(10) Patent No.: US 11,726,807 B2
(45) Date of Patent: Aug. 15, 2023

(54) SAFE EXECUTION OF VIRTUAL MACHINE CALLBACKS IN A HYPERVISOR

(71) Applicant: VMware, Inc., Palo Alto, CA (US)

(72) Inventors: Nadav Amit, Mountain View, CA (US); Michael Wei, Palo Alto, CA (US); Cheng Chun Tu, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 798 days.

(21) Appl. No.: 15/588,392

(22) Filed: May 5, 2017

(65) Prior Publication Data

US 2018/0321963 A1 Nov. 8, 2018

(51) Int. Cl.
*G06F 9/455* (2018.01)
*G06F 21/60* (2013.01)
*G06F 21/53* (2013.01)

(52) U.S. Cl.
CPC .......... *G06F 9/45558* (2013.01); *G06F 21/53* (2013.01); *G06F 21/60* (2013.01); *G06F 2009/45587* (2013.01)

(58) Field of Classification Search
CPC ...... G06F 12/1027; G06F 21/53; G06F 21/60; G06F 9/45558; G06F 2009/45587; G06F 2212/657
See application file for complete search history.

(56) References Cited

U.S. PATENT DOCUMENTS

| | | | | |
|---|---|---|---|---|
| 5,797,013 A | * | 8/1998 | Mahadevan | G06F 8/443 712/241 |
| 8,561,176 B1 | * | 10/2013 | Dalcher | G06F 11/3604 726/22 |
| 9,747,123 B2 | * | 8/2017 | Nakajima | G06F 9/45558 |
| 9,836,323 B1 | * | 12/2017 | Tsirkin | G06F 9/45558 |
| 10,223,538 B1 | * | 3/2019 | Cignetti | G06F 9/45558 |

(Continued)

OTHER PUBLICATIONS

Corbet et al. "A JIT for packet filters", Apr. 12, 2011,. pp. 1-2. Online link "https://lwn.net/Articles/437981/" (Year: 2011).*

(Continued)

*Primary Examiner* — Meng Ai T An
*Assistant Examiner* — Willy W Huaracha
(74) *Attorney, Agent, or Firm* — Dinsmore & Shohl LLP

(57) ABSTRACT

A hypervisor communicates with a guest operating system running in a virtual machine supported by the hypervisor using a hyper-callback whose functions are based on the particular guest operating system running the virtual machine and are triggered by one or more events in the guest operating system. The functions are modified to make sure they are safe to execute and to allow only limited access to the guest operating system. Additionally, the functions are converted to byte code corresponding to a simplified CPU and memory model and are safety checked by the hypervisor when registered with the hypervisor. The functions are executed by the hypervisor without any context switch between the hypervisor and guest operating system, and when executed, provide information about the particular guest operating system, allowing the hypervisor to improve operations such as page reclamation, virtual CPU scheduling, I/O operations, and tracing of the guest operating system.

21 Claims, 9 Drawing Sheets

(56) References Cited

U.S. PATENT DOCUMENTS

| | | | | |
|---|---|---|---|---|
| 2009/0119748 A1* | 5/2009 | Yao | ................ | G06F 9/45558 |
| | | | | 726/2 |
| 2009/0204962 A1* | 8/2009 | Diaz | ................ | G06F 9/45533 |
| | | | | 718/1 |
| 2011/0078361 A1* | 3/2011 | Chen | ................ | G06F 12/08 |
| | | | | 718/1 |
| 2011/0179417 A1* | 7/2011 | Inakoshi | ............ | G06F 9/45558 |
| | | | | 718/1 |
| 2018/0267818 A1* | 9/2018 | Dabak | ................ | G06F 9/45558 |
| 2019/0140983 A1* | 5/2019 | Tu | ................ | H04L 43/028 |

OTHER PUBLICATIONS

Amit, Nadav, et al. "Hypercallbacks: Decoupling Policy Decisions and Execution." In HotOS, pp. 37-41. 2017. (Year: 2017).*
Amit et al. "Hypercallbacks: Decoupling policy decisions and execution" ACM SIGOPS Operating Systems Review 51.1 (2017), pp. 54-59. (Year: 2017).*
Wang et al. "Jitk: A Trustworthy In-Kernel Interpreter Infrastructure" 11th {USENIX} Symposium on Operating Systems Design and Implementation ({OSDI} 14), pp. 33-47. (Year: 2014).*

* cited by examiner

SAFE EXECUTION OF VIRTUAL MACHINE CALLBACKS IN A HYPERVISOR

BACKGROUND

A hypervisor provides a virtualized environment in which a virtual machine (VM) can support a guest operating system (OS) that executes as if the guest OS were running on real hardware. In this environment, the guest OS carries out its resource management policies, such as I/O and memory management, without alteration. However, due to the isolation provided by the virtualized environment, the hypervisor has no detailed knowledge of these resource management policies, thereby causing a semantic gap between the hypervisor and the guest OS running in the VM. Without knowledge of the resource management policies, the hypervisor can and does make decisions that are at odds with the decisions of the guest OS, resulting in loss of efficiency. For example, while a VM has a certain policy for obtaining memory needed by the guest OS, the hypervisor also has a policy for making pages available to the VM, perhaps by taking pages from other VMs. Because the hypervisor has no knowledge of the pages that the VM needs, the hypervisor may make a policy decision making those pages unavailable or available with a long latency for the guest OS.

To address this semantic gap, improved communication between the hypervisor and the VM is needed. Two ways of improving the communication are paravirtualization and virtual machine introspection (VMI).

In paravirtualization, modifications or additions are made to the standard guest OS so that they can provide the hypervisor with information or utilities when the hypervisor needs to make a policy decision. These modifications or additions can also allow the hypervisor to provide the guest OS with information when the guest OS needs to make a policy decision. Thus, in paravirtualization, the guest OS and the hypervisor are closely linked with each other.

One example of a paravirtualization is a balloon driver that is added to the guest OS. The driver gives the hypervisor a facility to make a request, e.g., inflate the balloon, so that the guest OS gives up some unneeded memory that can be reclaimed by the host machine.

However, paravirtualization has drawbacks. One is that modifications to the guest OS can be extensive and are required for each new release of the OS. Another is that the communication between the guest OS and the hypervisor in the case of context switches is slow and in the case of "upcalls" has no guarantee of timeliness. In the case of ballooning, for example, there is no guarantee that the guest OS will attend to the ballooning request of the hypervisor in a timely manner.

Virtual machine introspection (VMI) is an alternative approach for improving communication between the hypervisor and VM. In this approach, the hypervisor is allowed to directly inspect data structures of a VM. This enables the hypervisor to make some policy decisions without depending on the VM to execute requests, partially addressing the drawbacks of paravirtualization. However, for VMI to work, the hypervisor needs to have knowledge of the data structures of the particular guest OS running in the VM. When a hypervisor is not updated when the guest OS changes, the hypervisor can obtain erroneous information and possibly cause the guest OS to fail. In addition, complex interactions with a running VM require locks and other concurrency mechanisms can further complicate VMI. Thus, with VMI, there is still too close a link between the hypervisor and the guest OS such that execution and policy decisions are still very intertwined.

SUMMARY

Embodiments provide a new technique of communication between a guest operating system and a hypervisor. The new technique is a hyper-callback whose functions are based on the particular guest operating system running the virtual machine and are to be executed in the hypervisor without a context switch between the guest operating system and the hypervisor in response to one or more events which are specified by the hyper-callback. Because a context switch is not required, the functions of the hyper-callback can be executed quickly. In addition, the functions are modified to make sure they are safe to execute and to allow only limited access to the guest operating system, though in some cases the functions can include ones that alter the guest OS or its state. Additionally, the functions are converted to byte code corresponding to a simplified CPU and memory model and are safety checked by the hypervisor when registered with the hypervisor. The functions when executed provide information about the particular guest operating system running in a virtual machine, allowing the hypervisor to improve operations such as page reclamation, virtual CPU scheduling, I/O operations, and tracing of the guest operating system.

A method for communicating information specific to a guest operating system to a hypervisor supporting a virtual machine in which the guest operating system is running, includes the steps of: (i) upon the occurrence of a specified event, obtaining callback byte code that has been registered with the hypervisor for the specified event, assembling the callback byte code into executable code, and executing the assembled callback executable code to obtain information regarding the operating system running in the virtual machine; and (ii) in response to executing the assembled callback executable code, obtain the information regarding the operating system running in the virtual machine.

Further embodiments include, without limitation, a non-transitory computer-readable storage medium that includes instructions for a processor to carry out the above method, and a computer system that includes a processor programmed to carry out the above method.

DETAILED DESCRIPTION

Figure 1:
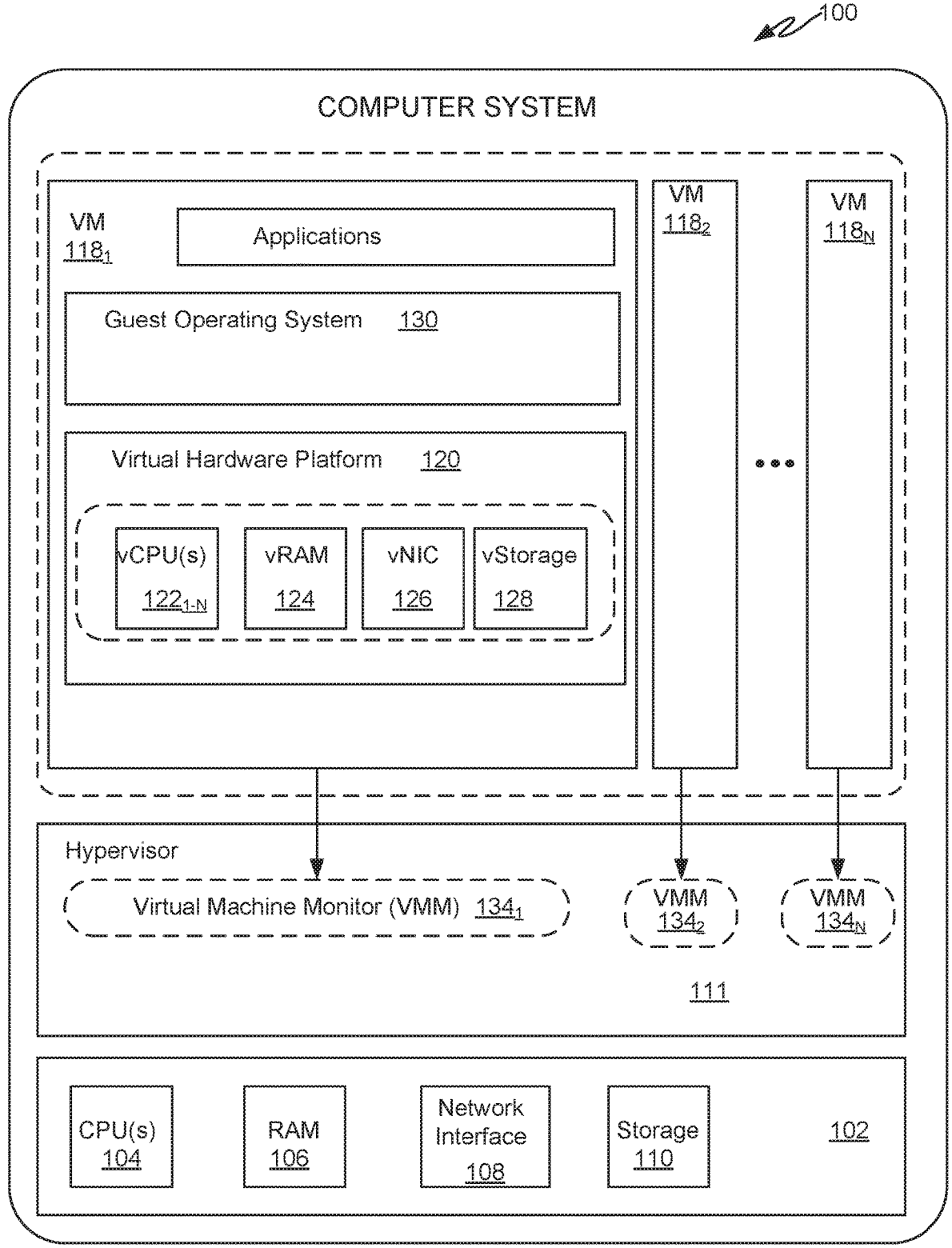
FIG. 1 depicts a block diagram of a computer system that is representative of a virtualized computer architecture in which embodiments of the new method of communication may be implemented.

FIG. 1 depicts a block diagram of a computer system 100 that is representative of a virtualized computer architecture in which embodiments of the new method of communication may be implemented. As is illustrated, computer system 100 hosts multiple virtual machines (VMs) $118_1$-$118_N$ that run on and share a common hardware platform 102. Hardware platform 102 includes conventional computer hardware components, such as one or more central processing units (CPUs) 104, random access memory (RAM) 106, one or more network interfaces 108, and a persistent storage 110.

A virtualization software layer, referred to herein after as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, the hypervisor 111 runs on top of a host operating system which itself runs on the hardware platform 102. In such an embodiment, hypervisor 111 operates above an abstraction level provided by the host operating system.

After instantiation, each VM $118_1$-$118_N$ encapsulates a physical computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as Microsoft Windows®, Linux®, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134.

Figure 2:
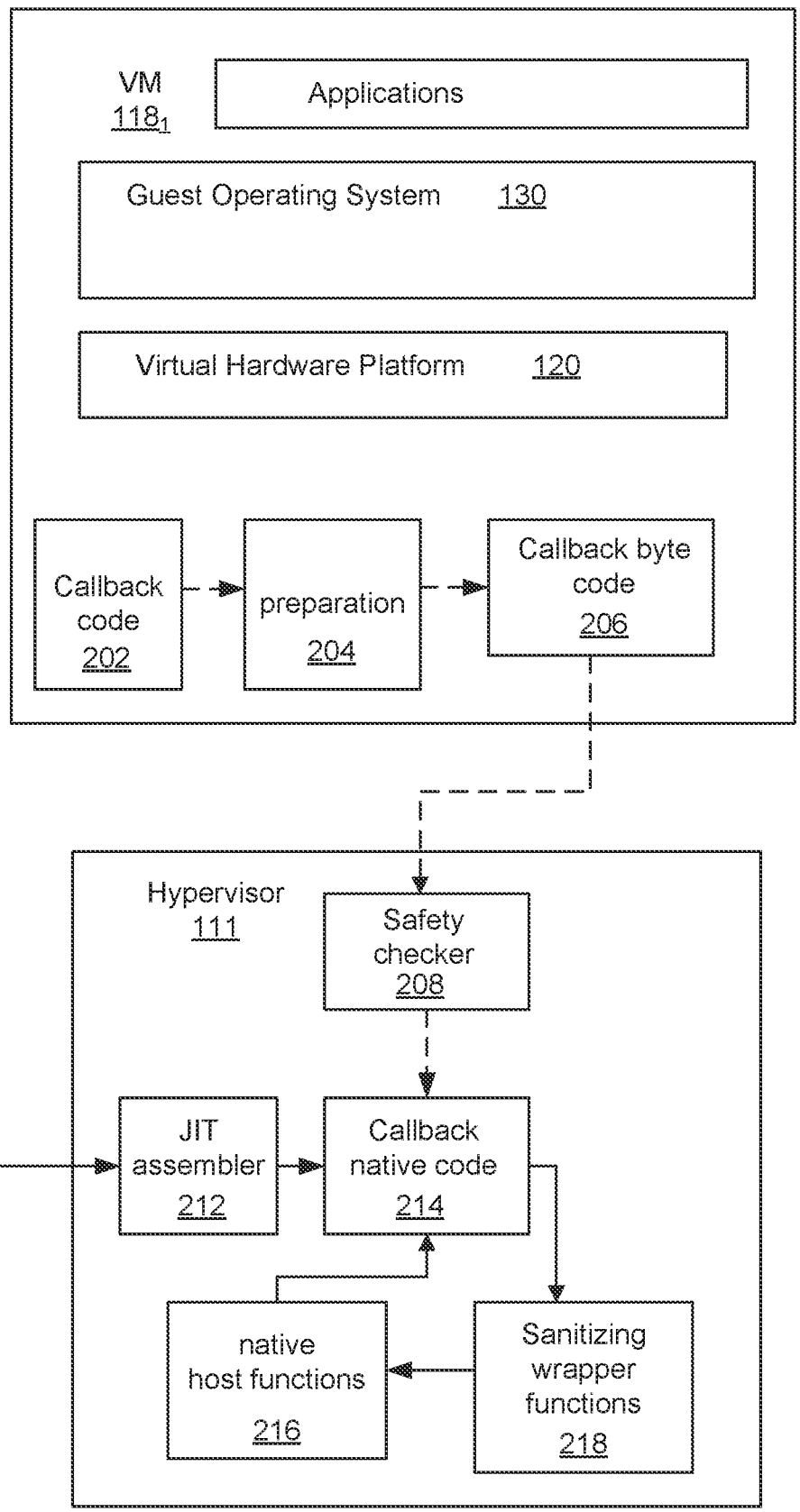
FIG. 2 depicts the communication between the guest OS in the VM and the hypervisor, according to embodiments.

FIG. 2 depicts the communication between the guest OS 130 in the VM $118_1$ and the hypervisor 111, according to embodiments. The communication involves both a registration path and an execution path.

In the registration path, the callback code 202 goes through a preparation phase 204 based on the particular guest operating system 130 running in the VM to generate intermediate callback byte code 206. Preparation phase 204 may be manual or automated. The callback byte code 206 is then sent to a safety checker 208 in the hypervisor 111 because the byte code is considered to be untrusted code. Not only is the callback byte code 206 prepared but memory regions which the callback byte code needs to access are also prepared and registered with the hypervisor 111. Registration includes specifying events to which the registered code should respond.

In the execution path, an event 210 occurs which invokes the just-in-time assembler (JIT) 212 in the hypervisor 111 to assemble the callback byte code 206 into executable code 214 for the machine on which the host runs. The executable code 214 is then hooked into native functions 216 of the hypervisor 111, using sanitizing wrapper functions 218, so that the code executes in the hypervisor 111 in response to the event for which the code is registered. The sanitizing wrapper functions 218 assure that the executable code 214 has the valid inputs when it is invoked by the specified event.

Figure 3:
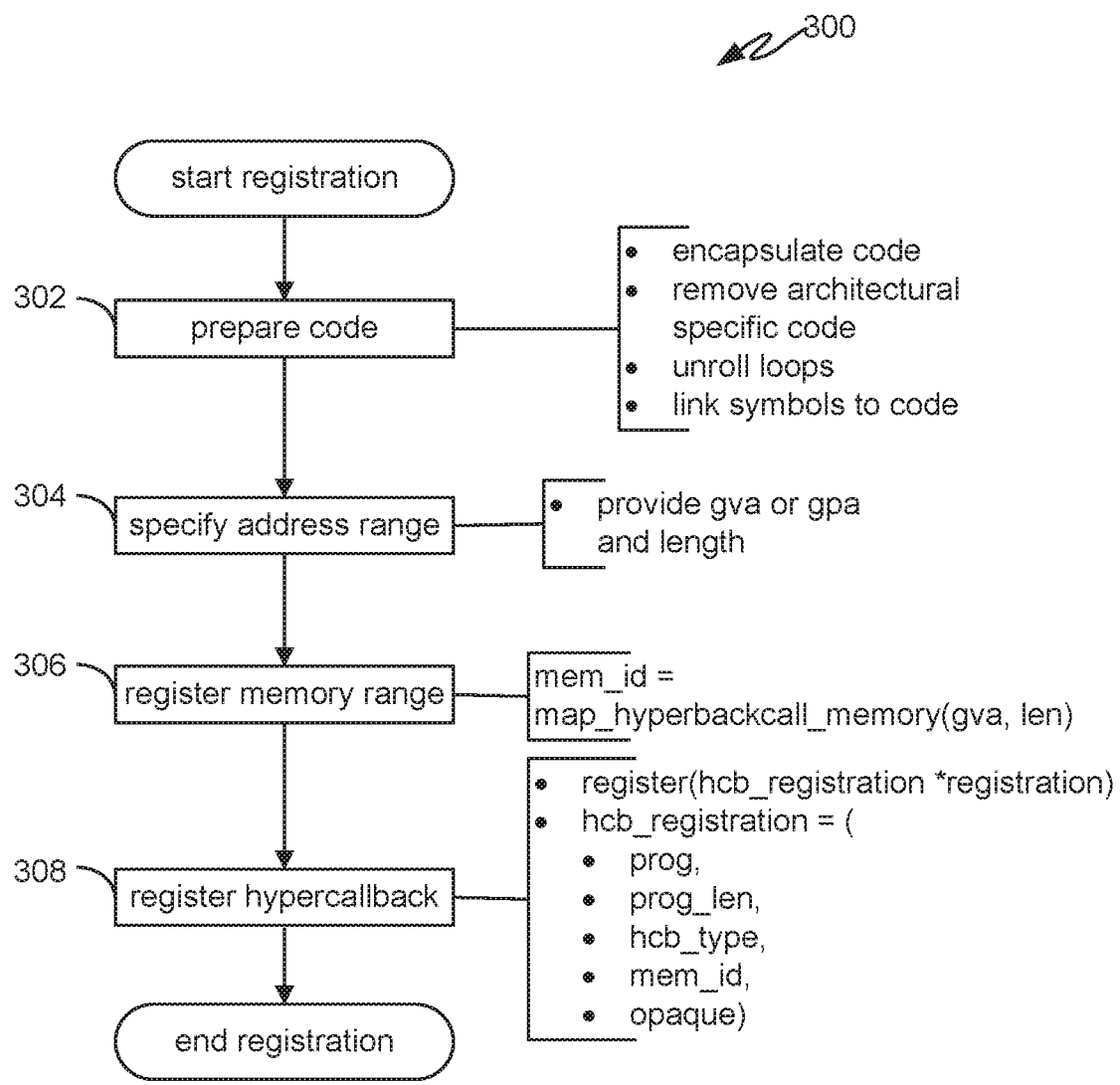
FIG. 3 depicts a method for the registration of the hyper-callback code, according to embodiments.

FIG. 3 depicts method 300 for the registration of the hyper-callback code, according to embodiments. In step 302, code specific to the guest OS on the VM is prepared. This includes encapsulating the code, removing any architecture specific sections, unrolling loops in the code, removing branches, and linking symbols to the code. In some embodiments, the code is converted to a known byte code. For example, one such byte code is the byte code developed for the Berkeley Packet Filtering (BPF) function or the Linux Socket Filtering (LSF) function. Both BPF and LSF provide a simple processor and memory model, i.e., a simple virtual machine. In BPF, the processor has an accumulator, a single register, and a limited set of instructions such as load, store, branch, alu and return instructions. The memory is simply a small register set.

In one embodiment, the byte code includes helper functions provided by the hypervisor. These helper functions assist in the cooperation between the hypervisor and the VM. Some helper functions include generate_ipi(vcpu, vector), get register(reg_num), set(register_reg_num, val), is_guest_pfn_present(pfn), where generate_ipi is used to generate an interprocessor interrupt or exception, get register obtains a value stored in a vCPU register reg_num, set_register sets a vCPU register reg_num to a value val and is_guest_page frame present determines whether a given page frame pfn is present in memory.

In some embodiments, the byte code includes other helper function to extend the byte code because the byte code lacks certain features. For example, a compare and exchange function, unsigned long cmpxchng(ptr, old, new) may be needed as well as a memory copy function memcpy.

In step 304, portions of a virtual address space of the guest OS are specified in the amount needed by the byte code. This includes creating a linear address space for the code within the virtual address space of the guest OS and providing a starting guest virtual address gva (i.e., an address within the virtual address space of the guest OS) and address length len.

In step 306, the starting guest virtual address gva and address length len are sent to the hypervisor via a map memory call. In one embodiment, the call is:

int map_hypercallback_memory(gva_t gva, unsigned long len), where gva is the starting guest virtual address of type gva_t, and len is an unsigned long integer giving the length of the address range to which the hypervisor is allowed access. The call returns an integer mem_id, which is an identifier for the address range that the hypervisor is allowed to access.

In another embodiment, the call is

```
int map_hypercallback_memory(gpa_t gpa, unsigned
    long len),
```
where gpa is the starting guest physical address, instead of the starting guest virtual address. In general, guest physical addresses are mapped from guest virtual addresses using guest page tables. In this particular example, the starting guest physical address is obtained from the starting guest virtual address using the guest page tables that map the guest virtual address space of the guest OS to the guest physical address space of the guest OS.

It is preferred that the permissible address range include only permanently mapped data structures such as the virtual memory and the direct mappings section for Linux and the non-paged pool for Windows.

In step 308, the hyper-callback is registered with the hypervisor by making a registering call. In one embodiment, the registering call is
```
int                 register_hypercallback(struct
    hcb_registration*registration),
```
where registration is a pointer to an hcb_registration structure and int is an integer error code returned by the call.

The hcb_registration structure, in one embodiment, is

TABLE 1

| [1] | struct hcb_registration { |
|---|---|
| [2] | struct bpf_prog *prog; |
| [3] | int prog_len; |
| [4] | unsigned int hcb_type; |
| [5] | int mem_id; |
| [6] | u64 opaque[HCB_VM_OPAQUE_SIZE]; |
| [7] | } | where prog is a pointer to the byte-code, prog_len is a integer giving the size of the byte-code program, hcb_type is an integer list or bit-wise integer list to indicate one or more events that can trigger the byte-code execution, mem_id is an integer identifying the memory region returned by the memory registration call, and opaque is an array size HCB_VM_OPAQUE_SIZE of unsigned 64-bit integers providing any extra data that is needed.

In some embodiments, the map_memory call and register calls can be integrated and performed at the same time. In such an embodiment, hcb_registration structure is expanded to include the gva and len or the gpa and len and no memory registration call is made.

Figure 4:
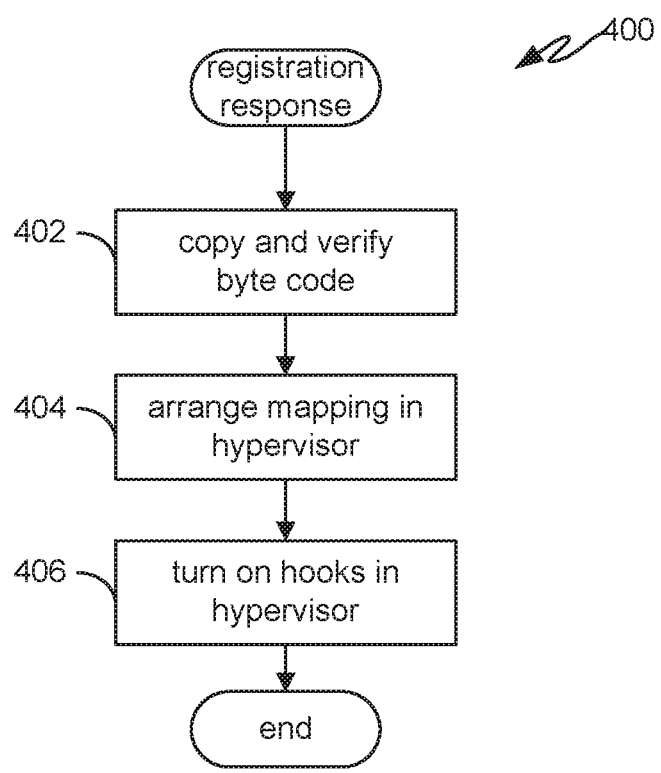
FIG. 4 depicts a method carried out by the hypervisor in response to registering the hyper-callback code, according to embodiments.

FIG. 4 depicts method 400 carried out by the hypervisor in response to registering the hyper-callback code, according to embodiments. In step 402 of the registration response, the hypervisor copies the bytecode and the safety checker verifies the copied bytecode. The safety checker assures that several safety properties are met. These include that: (1) all memory accesses by the code are to the VM state and to the callback arguments; (2) the running time or number of instructions of the callback is bounded; (3) no privileged instructions are run; and (4) if any helper functions in the hypervisor are called, they are only white-listed helper functions, where white-listed helper functions are those deemed to be safe and expressly identified in a whitelist. Bounding the execution time means in some embodiments that the bytecode cannot wait for locks, but can only acquire them. Also, waking cores that wait for a lock must be performed by a helper function because hyper-callbacks are not allowed to sends IPIs directly. Additionally, a hyper-callback is not allowed to traverse reverse mapping data structures. Finally, the verification includes performing input checks prevent potential attack vectors.

In step 404, the mapping for the hypervisor based on the registered gva or gpa is set up. The hypervisor uses addresses, hva, in a host address space that is different from the guest virtual address space gva or guest physical space gpa described above. This requires that the hypervisor modify the memory addresses from the given gva or gpa starting address to an hva starting address (possibly with an offset added to avoid a gva range already used in the hypervisor) to access the VM guest operating system data in according to the address range (gva, len) or (gpa, len) registered for the guest OS. Modification of the starting addresses, in the case of the x86-64 architecture, is performed efficiently by using a segment base in the x86 architecture. However, because these address spaces are different, it is desirable to avoid costly switching of the address spaces and possible access errors if a guest OS address is not valid.

To avoid these costs and possible errors, some limitations can be placed on the address ranges that are mapped from the hypervisor to the guest OS. First, it is desirable to limit access to VM guest OS data structures that are permanently mapped, such as those mentioned above. Second, it is desirable to limit the accessible address range in the guest OS to ones that are contiguous. In some embodiments, read-only zero-filled pages can be included in the map to fill any gaps to handle non-contiguous memory spaces. Third, it is desirable that the memory access in the guest OS are permanently present, i.e., not be paged out. If some guest OS memory can be paged out, then the hypervisor can pin the memory when the hyper-callback is registered. Otherwise, if access to the guest OS memory causes a page fault, the hyper-callback is either skipped (not executed) or provides its own code for recovery of the fault.

In step 406, hypervisor hooks the bytecode to the particular functions in the hypervisor that invoke the bytecode when a registered event occurs.

Figure 5:
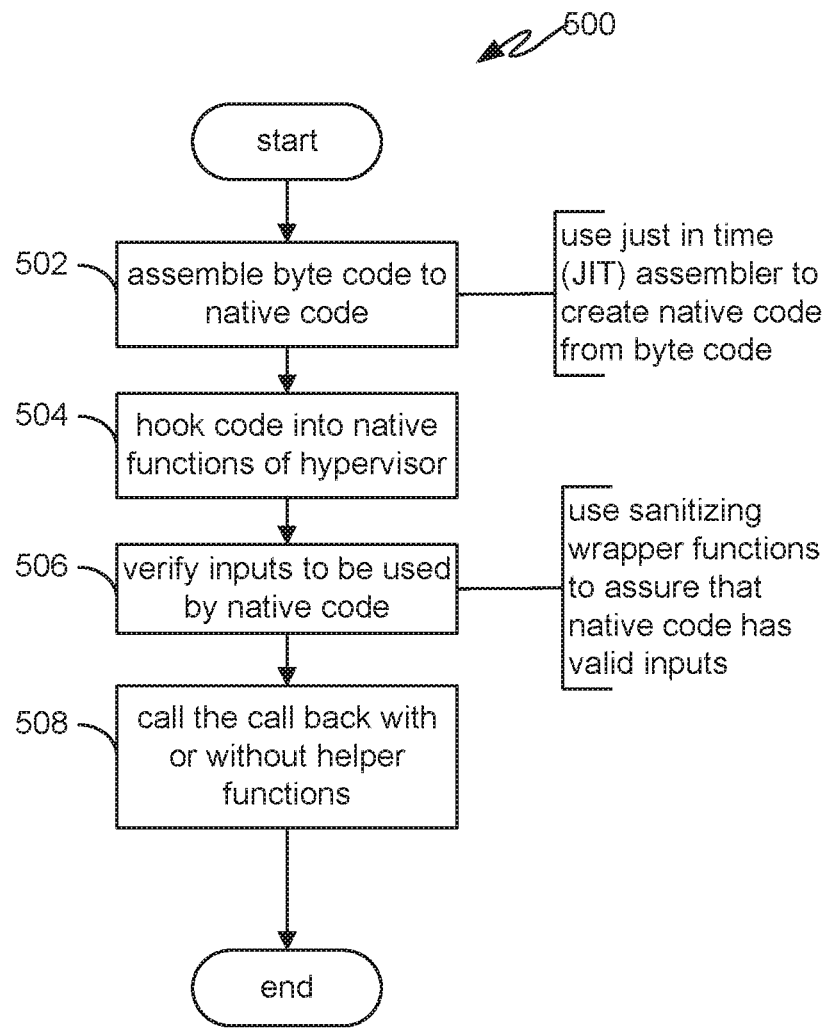
FIG. 5 depicts a method for executing the hyper-callback code, according to embodiments.

FIG. 5 depicts a method 500 for executing the hyper-callback code, according to embodiments. In step 502, the registered byte code is assembled to executable code (i.e., code executable on a physical or logical CPU 104 in FIG. 1). In step 504, the executable code is hooked into the native functions of the hypervisor so that it can be executed upon the occurrence of the event registered for the byte code. In step 506, the inputs to be used by the native byte code are checked, i.e., sanitized, to assure that they are properly specified for the bytecode. In step 508, the callback is executed upon the receipt of an event for which it was registered.

Page Reclamation

It is often the case that the hypervisor needs to inspect the state of the guest OS pages or that the guest OS needs to be notified when memory is paged by the hypervisor to carry out page reclamation policies in the guest OS. Hyper-callbacks facilitate the hypervisor in not conflicting with the page reclamation policies of the guest OS.

During a page frame reclamation process of the guest OS, it is desirable that the hypervisor be informed of the page frame to be reclaimed and whether it will be coalesced with other pages frames in the guest OS memory.

In one embodiment, the hypervisor calls a reclaim_notifier function. The notifier uses a guest page-frame number (GFN) as input and provides as an output (back to the hypervisor) whether the page is discardable.

In the case of Linux, to determine whether a page is discardable, the callback uses logic derived from the Linux is_free_buddy_page function, set forth in Table 2 below.

TABLE 2

```
[1]     bool is_free_buddy_page(struct page *page)
[2]     {
[3]         struct zone *zone = page_zone(page);
[4]         unsigned long pfn = page_to_pfn(page);
[5]         unsigned long flags;
[6]         unsigned int order;
[7]         spin_lock_irqsave(&zone->lock, flags);
[8]         for (order = 0; order < MAX_ORDER; order++) {
[9]             struct page *page_head = page - (pfn & ((1 << order) - 1));
[10]            if (PageBuddy(page_head) && page_order(page_head) >= order)
[11]                break;
[12]        }
[13]        spin_unlock_irqrestore(&zone->lock, flags);
[14]        return order < MAX_ORDER;
[15]    }
```

The function in Table 2 returns a Boolean indicating that a buddy of the given page frame is found and can be can be joined with its buddy (a page frame of the same order or larger), meaning that the page will be reclaimed and coalesced with its buddy. The hypervisor can use this information as a hint that the page will be reclaimed, so that it can allow the page to be re-allocated.

In accordance with step 302 in FIG. 3, the byte code used in the hyper-callback needs to prepared. This means that the "for" statement in Table 2 that iterates over the order variable at lines 8-12 is unrolled and the spin locks on the zones at lines 7 and 13 in one embodiment are altered so that the lock is only acquired if it is currently relinquished (no waiting for locks is allowed in the byte code). In the embodiment, the lock can be acquired by un-mapping it from the guest page tables before using it and ensuring that it cannot be mapped again in the VM pages tables while it is used or the lock can be acquired using the mechanisms in the guest OS. In other embodiments, byte code can be designed based on the functionality in the guest OS to both acquire and release the guest OS lock. Finally, the part of the spin lock function that saves the IRQs is removed as not needed, because the VM is suspended when the hypervisor is entered.

In addition, the hypervisor can gain insight by determining whether a page is in the page case by inspecting the fields, flags, and _mapcount, in the page struct. In the latter case, the hypervisor needs to inform the guest OS that the page was reclaimed, for example by setting a flag in the page struct; and the guest OS, modified by the hypervisor to check the flag, then does so before it maps a page from the page-cache.

Figure 6:
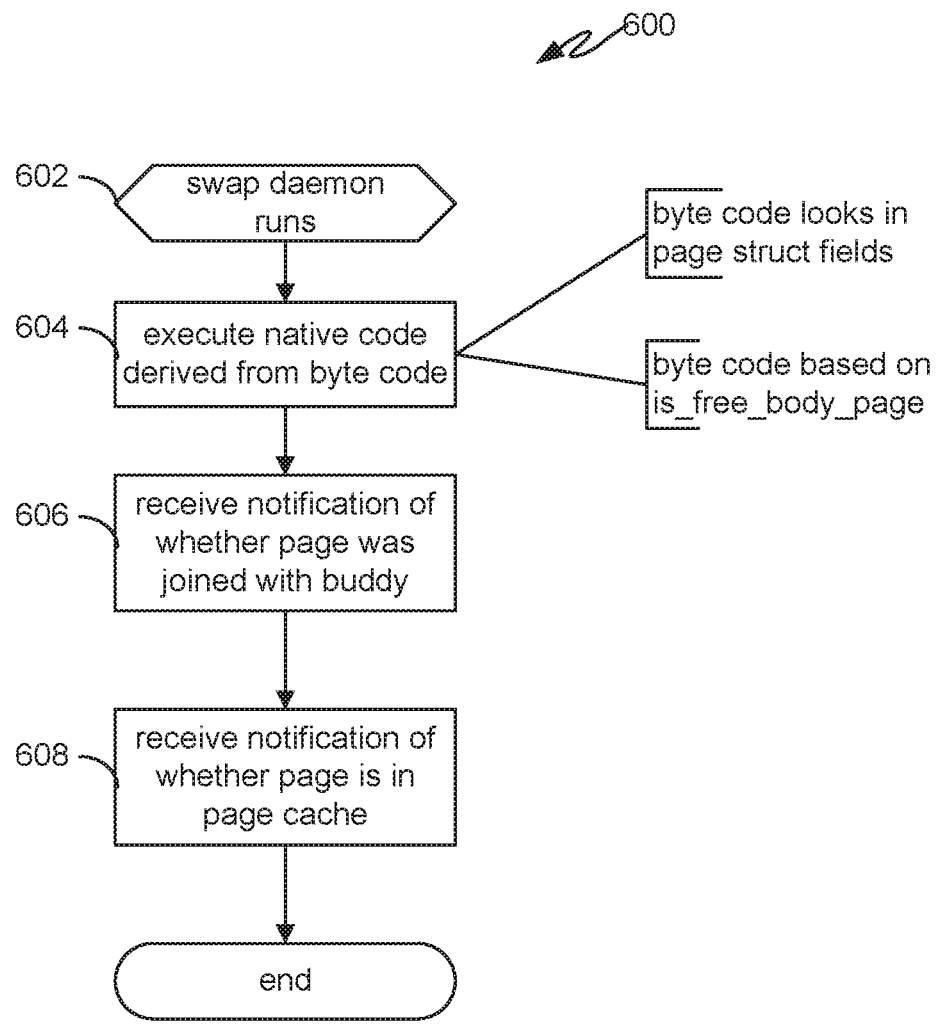
FIG. 6 depicts a method for a hyper-callback involving page reclamation when Linux is the guest OS, according to embodiments.

FIG. 6 depicts a method 600 for a hyper-callback involving page reclamation when Linux is the guest OS, according to embodiments. In step 602, the swap daemon runs in the hypervisor, in particular the VMM of the VM in which the guest OS is running. In this case, the swap daemon is one of the registered events that triggers the execution of the executable code derived from the byte code. Execution of the executable code in step 604 involves carrying out the steps of FIG. 5. This means that when the triggering event occurs, the byte code is assembled, hooked into the functions of the hypervisor and its inputs verified. The executable code in this case includes both code for receiving information about the buddy system and for examining the page struct as described above. In step 606, the hypervisor receives notification of whether the page, which was obtained by the byte code, was joined with its buddy in the buddy system of the guest OS. In step 608, the hypervisor receives notification of whether the page resides in the guest OS page cache.

The hypervisor then uses the results of method 600 to adjust its page reclamation policies. For example, if the page is free, according to the buddy system, the hypervisor may give preference to reclaiming the page because it does not need to write it back to disk and can give back a zeroed-page if the guest page frame is later needed. Notification of the page residing the in the OS page cache, allows the hypervisor to give preference to evicting the page over other pages and reclaiming the page without writing it back if the design of the byte code so allows, while informing the guest OS that the page was discarded. The hypervisor is likely to prefer reclaiming a page freed in the buddy system over the page residing in the page cache.

CPU Scheduling

In order to maximize the CPU utilization, hypervisors often abstain from co-scheduling virtual CPUs (vCPUs). However, guest operating systems are unaware of vCPU scheduling by the hypervisor, which results in synchronization latencies. For example, a preempted vCPU that holds a lock prevents other running vCPUs from progressing. Other mechanisms such as inter-processor interrupt (IPI) can induce overheads when the target CPU is not running.

Hyper-callbacks can improve this and other scheduling situations. For example, in the case of Linux, the hypervisor can gain insight into the scheduling of processes and threads in a guest OS, by using a variant of the sched_cpu_dying as the hyper-callback.

TABLE 3

```
[1]     int sched_cpu_dying(unsigned int cpu)
[2]     {
[3]         struct rq *rq = cpu_rq(cpu);
[4]         unsigned long flags;
[5]         /* Handle pending wakeups and then migrate everything off */
[6]         sched_ttwu_pending( );
[7]         raw_spin_lock_irqsave(&rq->lock, flags);
[8]         if (rq->rd) {
[9]             set_rq_offline(rq);
[10]        }
[11]        migrate_tasks(rq);
[12]        raw_spin_unlock_irqrestore(&rq->lock, flags);
[13]        calc_load_migrate(rq);
[14]        update_max_interval( );
[15]        nohz_balance_exit_idle(cpu);
[16]        hrtick_clear(rq);
[17]        return 0;
[18]    }
```

The function in Table 3 is used by the Linux kernel to select new run queues and the CPUs (vCPUs from the viewpoint of the hypervisor) for processes on a run queue of a CPU that is to be de-commissioned. Use of a variant of this function, after being prepared in accordance with step 302 of FIG. 3, thus gives the hypervisor information about the destination vCPUs to which tasks of a de-commissioned vCPU are migrated by the guest operating system. This, in turn, allows the hypervisor to adjust the mapping of vCPUs to pCPUs (physical or logical CPUs 104 in FIG. 1) available on the host and to better apply co-scheduling of virtual CPUs.

Figure 7:
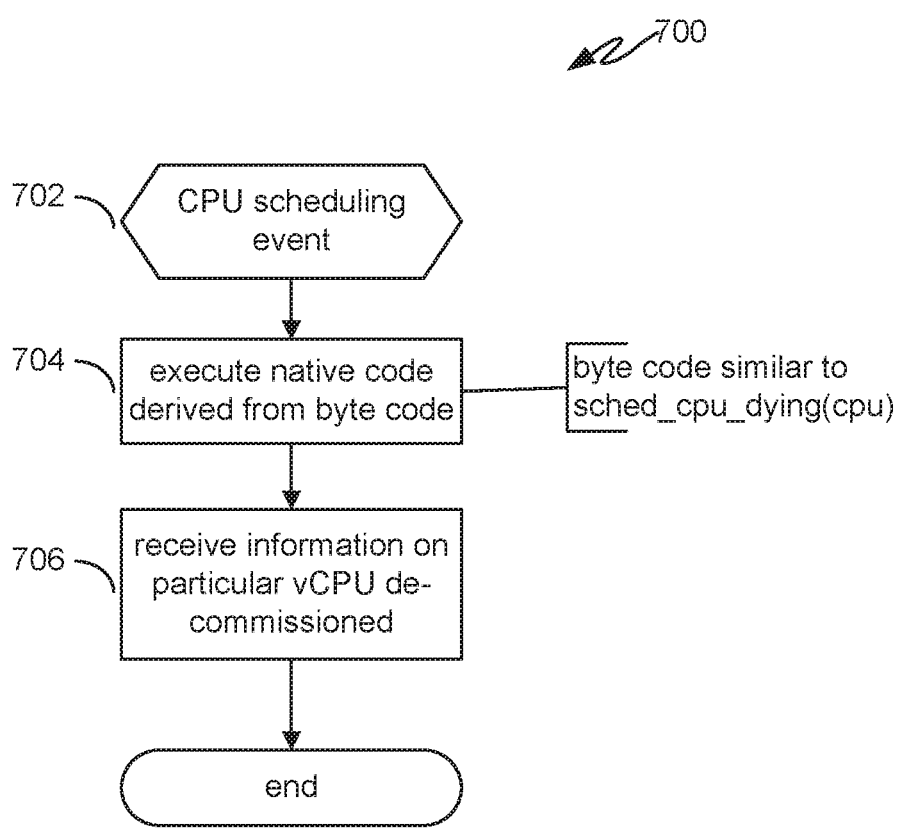
FIG. 7 depicts a method for a hyper-callback relating to vCPU scheduling, according to embodiments.

FIG. 7 depicts a method 700 for a hyper-callback relating to vCPU scheduling, according to embodiments. In step 702, a vCPU scheduling event occurs in the hypervisor. In step 704, executable code derived from byte code similar to sched_cpu_dying(cpu) is triggered by the scheduling event 702 and executes in the hypervisor. Again, execution of the executable code in step 704 includes the steps of FIG. 5. In step 706, the hypervisor receives information that a particular vCPU has been de-commissioned. This information allows the hypervisor to rebalance loads over the remaining vCPUs.

Storage and I/O Scheduling

The VM's insight into the I/O policies of the hypervisor is limited, and typically, the hypervisor enforces coarse-grained policies such as static IOPS limits or relies on hardware via pass through. Hyper-callbacks provide a high performance mechanism for hypervisors to introspect and prioritize VM I/O scheduling decisions as well as for the VM to react to I/O pressure in the hypervisor.

When the hypervisor dispatches I/O requests, it calls a registered VM callback to determine which I/O would be dispatched out of the paravirtual or emulated I/O device queue.

In Linux, for example, this callback can behave similarly to the deadline_check_fifo function, whose code is listed in Table 4 below.

TABLE 4

| [1] | int deadline_check_fifo(struct deadline_data *dd, int ddir) |
| --- | --- |
| [2] | { |
| [3] | struct request *rq = rq_entry_fifo(dd->fifo_list[ddir].next); |
| [4] | /* |
| [5] | *rq is expired! |
| [6] | */ |
| [7] | if (time_after_eq(jiffies, (unsigned long)rq->fifo_time)) |
| [8] | return 1; |
| [9] | return 0; |
| [10] | } |

In Linux, the code in Table 4 is part of the I/O scheduler, which attempts to reorder I/O requests to minimize I/O delays. The code checks to determine whether there are any expired requests on the deadline fifo. If a request on the deadline fifo has expired, then the expired request is handled rather than the next read or write request. This gives the hypervisor information about the next I/O to be scheduled by the guest OS.

If the hypervisor needs to check the VM queues in detail, it can use the elv_rb_former_request( ) and elv_rb_latter_request( ) Linux kernel functions which inspect the request queue (the elevator queue) without scheduling the VM. Note, however, that it is the VM device queue that is inspected and not the OS request queue.

Figure 8:
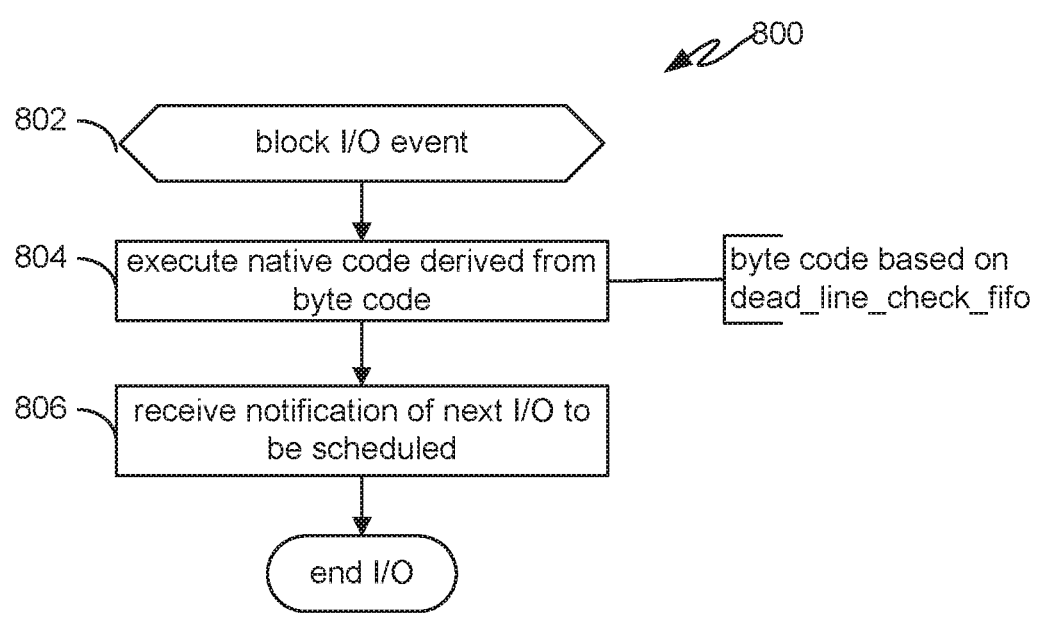
FIG. 8 depicts a method for a hyper-callback relating to I/O scheduling, according to embodiments.

FIG. 8 depicts a method 800 for a hyper-callback relating to I/O scheduling, according to embodiments. In step 802, a block I/O event occurs, due to an I/O associated with the VM being dispatched by the hypervisor. In step 804, the executable code derived from byte code similar to deadline_check_fifo is triggered by the I/O event and executes in the hypervisor. Executing executable code in step 804 includes executing the steps of FIG. 5. In step 806, the hypervisor receives notification of the next I/O to be scheduled based on the results of the byte code.

Profiling and Tracing

Profiling the runtime behavior of a guest OS running on a VM can be difficult without insight into the hypervisor. In this case, hyper-callbacks enable the VM to be notified of events when they occur, thus allowing fine-grained profiling that is not possible with paravirtualization.

For example, when certain events associated with a certain VM occur, notifiers of the VM are called. Such events can include: VM-exit, VM-entry, interrupt injection, and (de)scheduling a vCPU. The notifier is called with basic information about the corresponding event (e.g., exit-reason on VM-exit) and inspects the VM and vCPU state using helper functions that the hypervisor provides.

For tracing events, the hyper-callback can implement similar logic to Linux's trace_printk function. Specifically, the trace_printk function is modified to write its profile information directly to a location in VM memory, instead of the normal writing to a ring buffer in the guest OS kernel.

Figure 9:
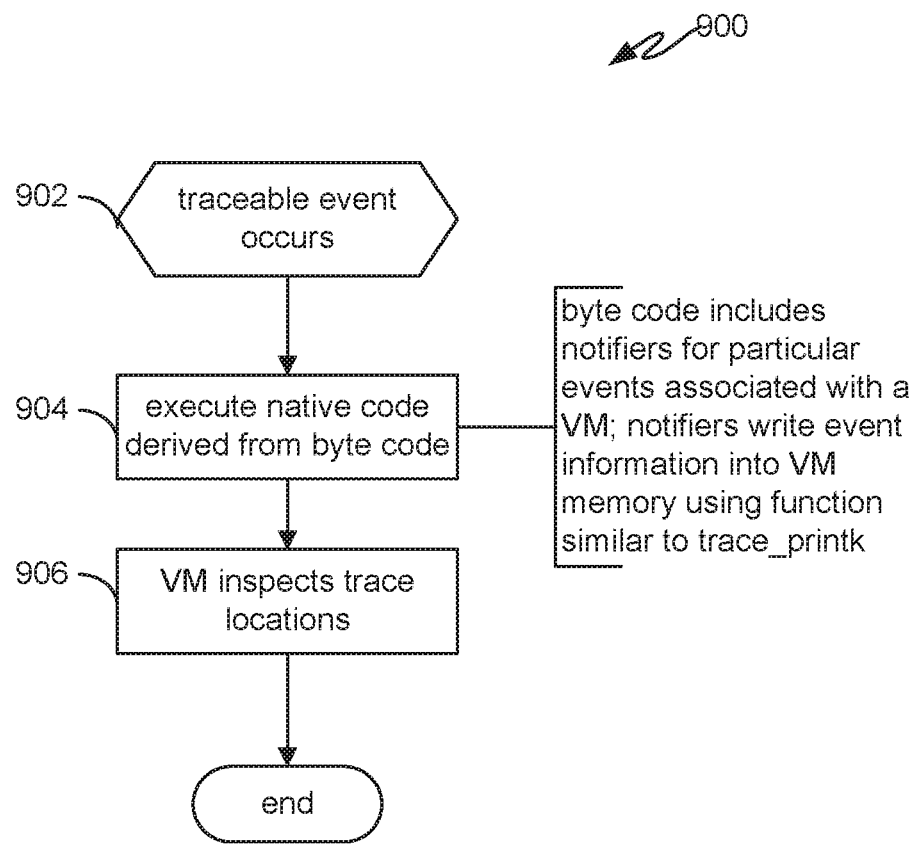
FIG. 9 depicts a method for a hyper-callback involving profiling and tracing, according to embodiments.

FIG. 9 depicts a method 900 for a hyper-callback involving profiling and tracing, according to embodiments. In step 902, a traceable event, such as a VM-exit or VM-entry event or similar event, occurs. In step 904, the hypervisor executes executable code derived from byte code that includes notifiers for the events such as VM exit or VM entry. Execution of executable code includes the steps of FIG. 5. The notifiers write information into a trace location in the virtual machine instead of returning a buffer to the guest OS kernel, with the help of a function similar to trace_printk. In step 906, the virtual machine inspects the trace locations.

Thus, by providing a hyper-callback, the hypervisor is able to execute functions without a context switch or VM entry, and thus within the hypervisor context, where the functions are tailored to the particular guest operating system running in a virtual machine supported by the hypervisor. These functions can provide the hypervisor with information that allows the hypervisor to make better policy choices regarding memory management, virtual CPU scheduling and I/O scheduling and to obtain better tracing information when selected hypervisor events occur.

Embodiments employ hyper-callbacks that enable a guest OS (i.e., an operating system of a VM) to provide untrusted callback code to a hypervisor to be called in the hypervisor context on certain predefined events, e.g., virtual CPU preemption. The hyper-callbacks can be used to notify the VM about an event (e.g., memory-page reclaimed) or consult with the guest OS regarding hypervisor decisions (e.g., whether a reclaimed page can be discarded). Execution of the hyper-callback does not require a context switch or VM entry.

As described above, the guest OS registers a hyper-callback with the hypervisor using a hypercall and provides one or more event IDs, bytecode of the hypercall, and the virtual address range of the guest OS that the hyper-callback is allowed to use. The hypervisor then checks the hyper-callback safety using static analysis methods, e.g., that the hyper-callback does not execute privileged instructions, that memory accesses are permitted according to the hypervisor policy, and that the number of instructions it runs is bounded (or runtime is bounded).

The hypervisor maps the permitted virtual address range of the guest OS to its host virtual address space to allow the hyper-callback to efficiently access the memory space of the guest OS. Mapping can be done with host virtual addresses which are different from the virtual addresses of the guest OS, and in one embodiments, the memory region is allocated contiguously. In an alternative embodiment, holes within the address range (guest OS virtual or host virtual) are filled up with read-only zero-pages. This scheme can be used, e.g., when mapping to non-paged pool in Windows and non-contiguous memory in Linux. Because the hypervisor maps the permitted virtual address range of the guest OS to its host virtual address space, the assembled byte code is enabled to access the permitted virtual address range of the guest OS using different starting addresses.

As further described above, the hypervisor defines helper functions that the VM is allowed to hook into when the hyper-callbacks are executed. A static analysis tool, during registration, ensures that only allowed helper functions (e.g., helper functions identified in a whitelist) are called.

When an event that is registered with the hyper-callback occurs, the hypervisor invokes the assembled byte code of the hyper-callback. The output of the hyper-callback can be used to influence hypervisor behavior, or provide hints from the guest OS regarding the preferable policy for allocating resources for the VM. The hyper-callback can also change the state of the VM and access VM memory within a pre-defined permitted address range. If during the hyper-callback, a page-fault occurs (e.g., if the hypervisor did not pin the pre-defined permitted address range of the VM memory), the execution of the hyper-callback is skipped.

This solution provides the hypervisor visibility into the VM state, while providing flexibility to adapt to upgrades made to or new versions of the guest OS. The execution of the hyper-callback is fast since it is done in the hypervisor context, and does not require context switch. In addition, this solution enables the VM to be notified regarding hypervisor events associated with the guest OS, e.g., VM entries and VM exits which are useful when the guest OS carries out tracing.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. In a system having one or more processors and a memory coupled to the one or more processors and containing a hypervisor that supports a virtual machine running a guest operating system, a method for communicating information specific to the guest operating system to the hypervisor, said method comprising:
   upon an occurrence of a specified event,
      obtaining, by the hypervisor, callback byte code that has been registered by the guest operating system with the hypervisor for the specified event;
      assembling, by the hypervisor, the callback byte code into executable code that runs on the one or more processors; and executing, by the hypervisor, the assembled callback executable code to obtain information regarding the guest operating system running in the virtual machine; and in response to executing the assembled callback executable code, obtaining, by the hypervisor, the information regarding the guest operating system running in the virtual machine.

2. The method according to claim 1, wherein the callback byte code is based on a simplified CPU and memory architecture.

3. The method according to claim 1, wherein the callback byte code is derived and prepared from one or more functions of the guest operating system.

4. The method according to claim 3, wherein preparation of the callback byte code includes unrolling loops and removing branches in the one or more functions.

5. The method according to claim 1, wherein the callback byte code is registered with the hypervisor prior to the occurrence of the specified event, and the assembled callback executable code is executed without a context switch responsive to the occurrence of the specified event.

6. The method according to claim 1, wherein the callback byte code is prepared so as to permit the hypervisor to access only a range of addresses in the guest operating system.

7. The method according to claim 6, wherein the range of addresses is registered with the hypervisor prior to the occurrence of the specified event.

8. The method according to claim 7, wherein the range of addresses registered with the hypervisor is registered as guest virtual addresses.

9. The method according to claim 7, wherein the range of addresses registered with the hypervisor is registered as guest physical addresses.

10. The method according to claim 1, wherein the hypervisor is further configured to check for valid inputs in the assembled callback executable code.

11. The method according to claim 1, wherein the hypervisor is further configured to hook in hypervisor functions to the assembled callback executable code.

12. The method according to claim 1, wherein the callback byte code has been safety checked by the hypervisor to ensure that the callback byte code complies with one or more safety properties.

13. A non-transitory computer-readable medium comprising computer program code executable in a system having one or more processors and a memory coupled to the one or more processors and containing a hypervisor that supports a virtual machine running a guest operating system, wherein the computer program code when executed carries out a method for communicating information specific to the guest operating system to the hypervisor, said method comprising:

upon an occurrence of a specified event,
obtaining, by the hypervisor, callback byte code that has been registered by the guest operating system with the hypervisor for the specified event;
assembling, by the hypervisor, the callback byte code into executable code that runs on the one or more processors; and
executing, by the hypervisor, the assembled callback executable code to obtain information regarding the guest operating system running in the virtual machine; and
in response to executing the assembled callback executable code, obtaining, by the hypervisor, the information regarding the guest operating system running in the virtual machine.

14. The non-transitory computer-readable medium according to claim 13, wherein the callback byte code is a based on a simplified CPU and memory architecture.

15. The non-transitory computer-readable medium according to claim 13, wherein the callback byte code is prepared from one or more functions of the guest operating system.

16. The non-transitory computer-readable medium according to claim 13, wherein the callback byte code is registered with the hypervisor prior to the occurrence of the specified event, and the assembled callback executable code is executed without a context switch responsive to the occurrence of the specified event.

17. The non-transitory computer-readable medium according to claim 13, wherein the callback byte code is prepared so as to permit the hypervisor to access only a range of addresses in the guest operating system.

18. The non-transitory computer-readable medium according to claim 13, wherein the hypervisor is further configured to check for valid inputs in the assembled callback executable code.

19. The non-transitory computer-readable medium according to claim 13, wherein the hypervisor is further configured to hook in hypervisor functions to the assembled callback executable code.

20. A system comprising:
one or more processors; and
a memory coupled to the one or more processors and containing a hypervisor that supports a virtual machine running a guest operating system, wherein the hypervisor is configured to perform a method, the method comprising:
upon an occurrence of a specified event,
obtaining, by the hypervisor, callback byte code that has been registered by the guest operating system with the hypervisor for the specified event;
assembling, by the hypervisor, the callback byte code into executable code that runs on the one or more processors; and
executing, by the hypervisor, the assembled callback executable code to obtain information regarding the guest operating system running in the virtual machine; and
in response to executing the assembled callback executable code, obtaining, by the hypervisor, the information regarding the guest operating system running in the virtual machine.

21. The system according to claim 20, wherein the callback byte code is prepared from one or more functions of the guest operating system and is registered with the hypervisor prior to the occurrence of the event.

* * * * *